(12) United States Patent
Agostini et al.

(10) Patent No.: US 12,145,421 B2
(45) Date of Patent: Nov. 19, 2024

(54) AIR TREATMENT SYSTEM FOR A CLOSABLE ROOM, IN PARTICULAR FOR A CABIN, OF A VEHICLE

(71) Applicant: TESIO COOLING SYSTEMS S.P.A., Moncalieri (IT)

(72) Inventors: Francesco Agostini, Moncalieri (IT); Gualtiero Carboni, Moncalieri (IT)

(73) Assignee: TESIO COOLING SYSTEMS S.P.A. (IT)

( * ) Notice: Subject to any disclaimer, the term of this patent is extended or adjusted under 35 U.S.C. 154(b) by 430 days.

(21) Appl. No.: 17/694,289

(22) Filed: Mar. 14, 2022

(65) Prior Publication Data

US 2022/0297500 A1    Sep. 22, 2022

(30) Foreign Application Priority Data

Mar. 16, 2021   (IT) .......................... 102021000006191

(51) Int. Cl.
*B60H 1/00* (2006.01)
*B01D 46/00* (2022.01)
(Continued)

(52) U.S. Cl.
CPC ..... *B60H 1/00378* (2013.01); *B01D 46/0049* (2013.01); *B01D 46/4272* (2013.01); *B01D 46/444* (2013.01); *B01D 46/446* (2013.01); *B01D 46/46* (2013.01); *B01D 46/56* (2022.01); *B60H 1/00028* (2013.01);
(Continued)

(58) Field of Classification Search
CPC ............ B60H 1/00378; B60H 1/00028; B60H 1/00849; B60H 3/0641; B60H 2001/00092; B60H 1/00735; B60H 1/00842; B60H 3/0633; B60H 2001/00235; B01D 46/0049; B01D 46/4272; B01D 46/444;
(Continued)

(56) References Cited

U.S. PATENT DOCUMENTS 4,581,988 A * 4/1986 Mattei ................ B60H 1/00378
                                                    96/111
5,280,852 A * 1/1994 Dauvergne ............ B60H 1/034
                                                    237/12.3 A
(Continued)

FOREIGN PATENT DOCUMENTS

EP         0120753 A1   10/1984

*Primary Examiner* — Frank M Lawrence, Jr.
(74) *Attorney, Agent, or Firm* — The Belles Group, P.C.

(57) ABSTRACT

An air treatment system is described, for a closable room of a vehicle, comprising: an air conditioning device provided with a fan and connectable to the room; an inlet opening for outside air, connected to the air conditioning device; a filtration device for filtering the outside air entering from the inlet opening; a recirculation port; a valve assembly provided with a shutter member, interposed between the inlet opening, the recirculation port and the air conditioning device and movable between a plurality of operating positions, in which it varies the shares of air coming from the inlet opening and the recirculation port; and a control unit to adjust the operating position of the shutter member so as to control the shares of air being drawn from the inlet opening and from the recirculation port and to maintain a predetermined value of overpressure in the room with respect to the outside.

10 Claims, 4 Drawing Sheets

(51) Int. Cl.
*B01D 46/42* (2006.01)
*B01D 46/44* (2006.01)
*B01D 46/46* (2006.01)
*B01D 46/56* (2022.01)
*B60H 3/06* (2006.01)

(52) U.S. Cl.
CPC ....... *B60H 1/00849* (2013.01); *B60H 3/0641* (2013.01); *B01D 2273/30* (2013.01); *B01D 2279/40* (2013.01); *B01D 2279/50* (2013.01); *B60H 2001/00092* (2013.01)

(58) Field of Classification Search
CPC ...... B01D 46/446; B01D 46/46; B01D 46/56; B01D 2273/30; B01D 2279/40; B01D 2279/50
USPC .................................. 96/400; 55/342, 350.1
See application file for complete search history.

(56) References Cited

U.S. PATENT DOCUMENTS

| | | |
|---|---|---|
| 2003/0156043 A1 | 8/2003 | Doescher et al. |
| 2008/0014856 A1* | 1/2008 | Voit ................... B60H 1/00849 454/158 |
| 2018/0178617 A1 | 6/2018 | Ferri et al. |
| 2021/0188052 A1* | 6/2021 | Haf ...................... B60H 3/0641 |

* cited by examiner

AIR TREATMENT SYSTEM FOR A CLOSABLE ROOM, IN PARTICULAR FOR A CABIN, OF A VEHICLE

CROSS-REFERENCE TO RELATED APPLICATIONS

This patent application claims priority from Italian patent application no. 102021000006191 filed on Mar. 16, 2021, the entire disclosure of which is incorporated herein by reference.

TECHNICAL SECTOR

The present invention relates to an air treatment system for a closable or confined room of a vehicle, in particular for a cabin of a self-propelled agricultural machine, to which the following description will explicitly refer without losing generality.

BACKGROUND

An air treatment system for a cabin of an agricultural machine is known from patent EP-B1-3131773, comprising:
a box hermetically closed with a cover and pressurized;
an air conditioning device also located inside the box, provided with one or more fans, an evaporator and a heater and connected to the inside of the cabin by means of a connection opening for supplying conditioned and pressurized air into the room itself;
a first inlet opening for external air, obtained in the box and connected to the air conditioning device;
a first filtration device, having a first filtration level, carried by the box and disposed downstream of the first inlet opening to filter external air entering the box itself;
a second inlet opening for external air, obtained in the box and also connected to the air conditioning device;
a second filtration device, having a second filtration level lower than the first filtration level, carried by the box and disposed downstream of the second inlet opening to filter external air entering the box itself;
a recirculation port to allow in use recirculation of air present in the cabin to the air conditioning device; and
a valve assembly for selectively controlling the inflow of outside air to the air conditioning device from the two filtration devices.

The treatment system shown in patent EP-B1-3131773 further comprises an additional fan, distinct from the fan(s) of the air conditioning device, disposed directly downstream of the first filtration device and having the function of pressurizing the incoming outside air.

Without the additional fan, most of the intake air would come from recirculation. The aforesaid additional fan therefore allows to significantly increase the share of filtered air from outside that is supplied into the cabin.

However, the solution described, due to the presence of the additional fan, causes a series of disadvantages.

First of all, the fact that the additional fan has to be disposed immediately downstream of the filtration device from which the external air intake is to be determined results in a significant constraint on the layout of the air treatment system.

In addition, such an additional fan has a relatively large footprint as well as significant cost and energy consumption.

Finally, the maximum prevalence of the additional fan, disposed directly downstream of the first filtration device, may not be sufficient for the correct operation of the system if this filtration device is clogged.

OBJECT AND SUMMARY OF THE INVENTION

Aim of the present invention is therefore to realize an air treatment system for a closable room of a vehicle, in particular for a cabin of the vehicle itself, which makes it possible to overcome the disadvantages connected to the air treatment systems of the known type and specified above.

According to the invention, this aim is achieved by an air treatment system for a closable room of a vehicle, in particular for a cabin of the vehicle itself, as claimed in claim 1.

BRIEF DESCRIPTION OF THE DRAWINGS

For a better understanding of the present invention, two preferred non-limiting embodiments are described below, by way of example only and with the aid of the accompanying drawings, wherein.

DETAILED DESCRIPTION

Figure 1:
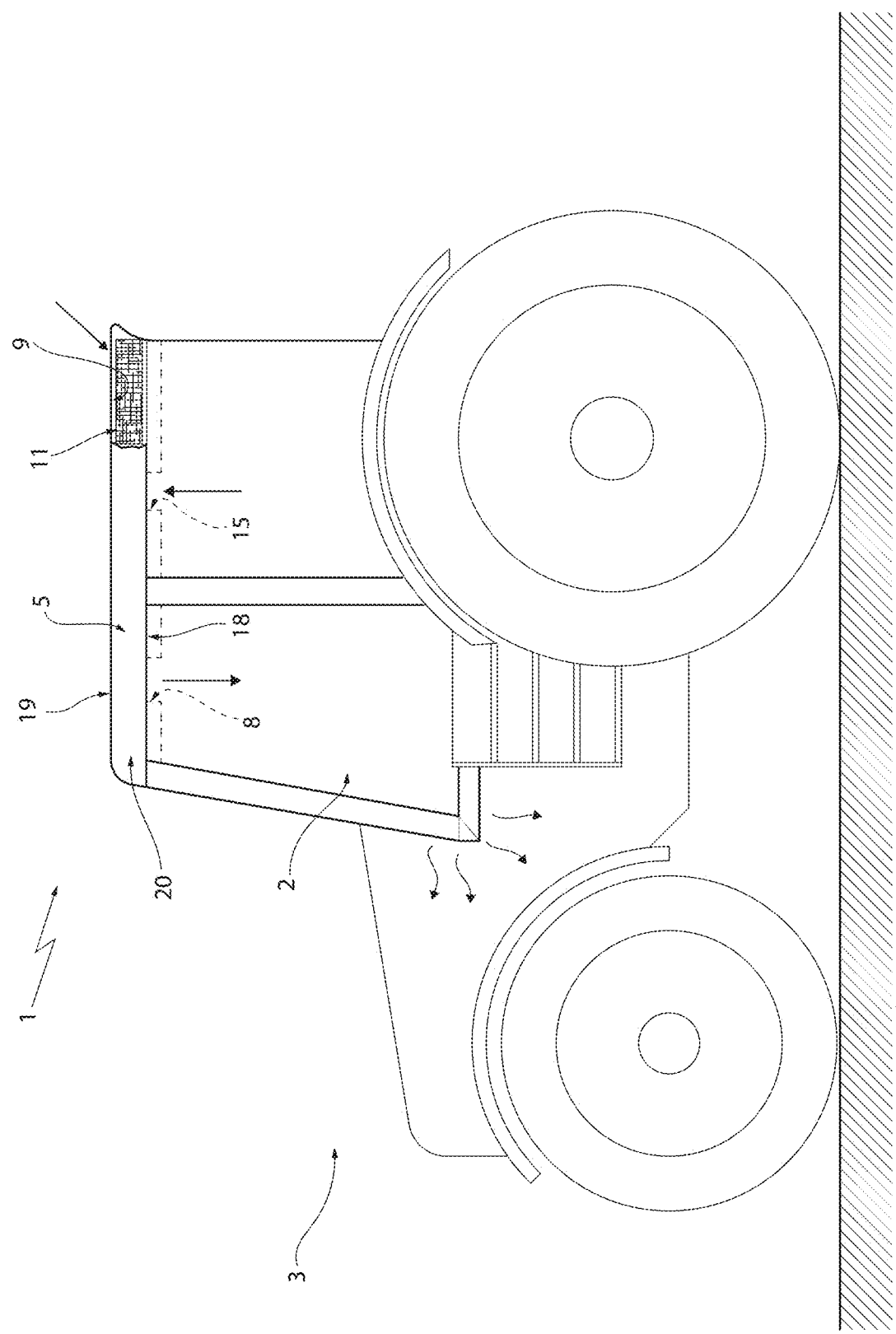
FIG. 1 shows schematically and in side view a vehicle, specifically a self-propelled agricultural machine, provided with an air treatment system realized according to the dictates of the present invention.
Figure 2A:
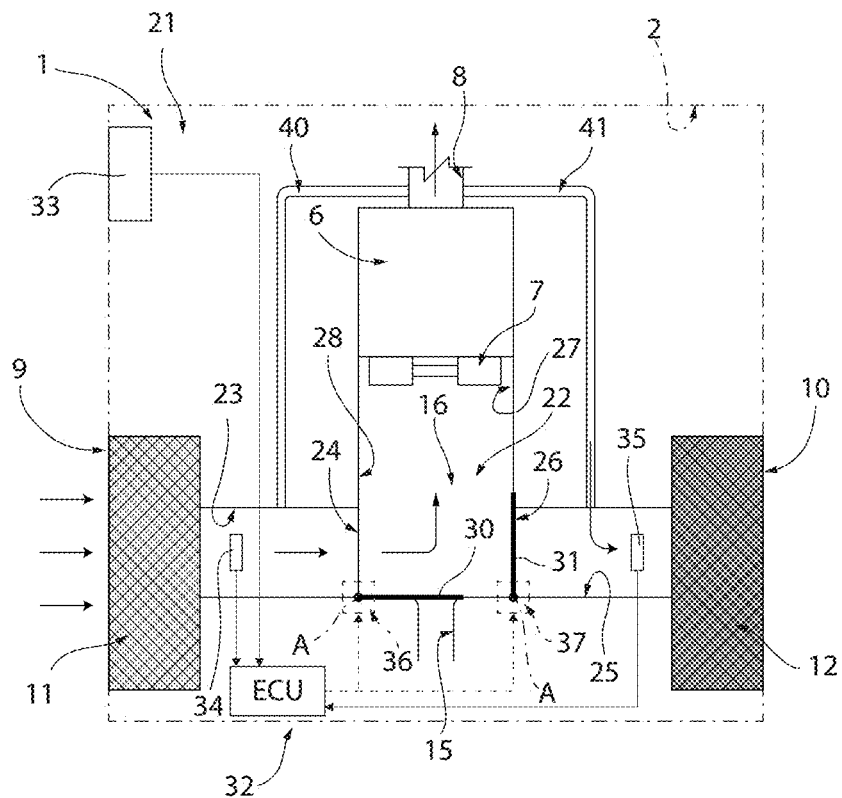
FIGS. 2A to 2D show schematically, in top view on an enlarged scale and with parts removed for clarity's sake, the air treatment system of FIG. 1 under different operating conditions.
Figure 2B:
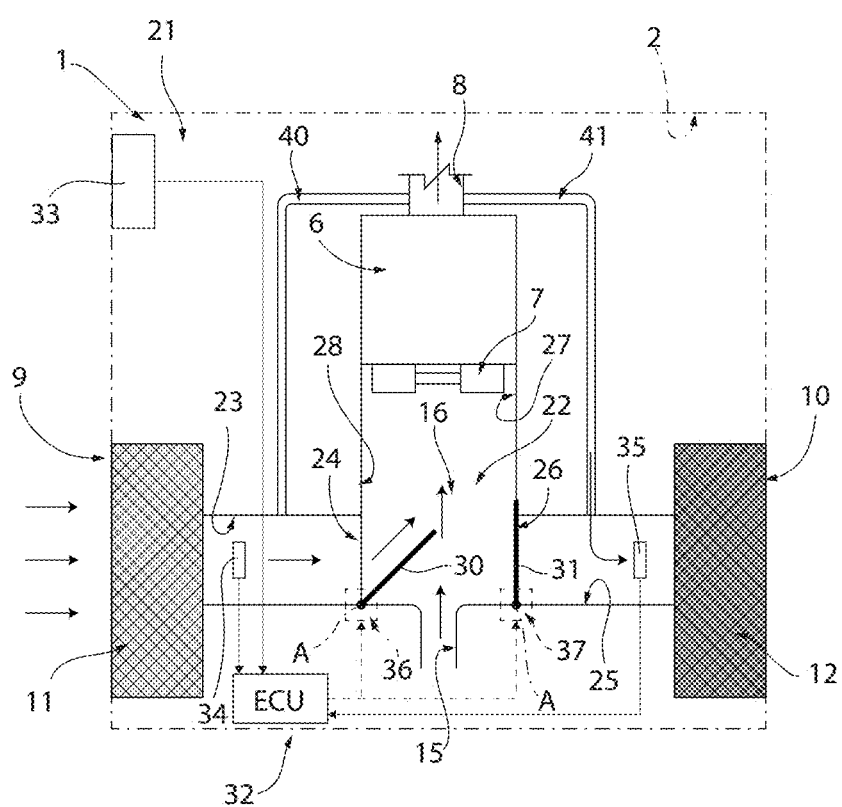
Figure 2C:
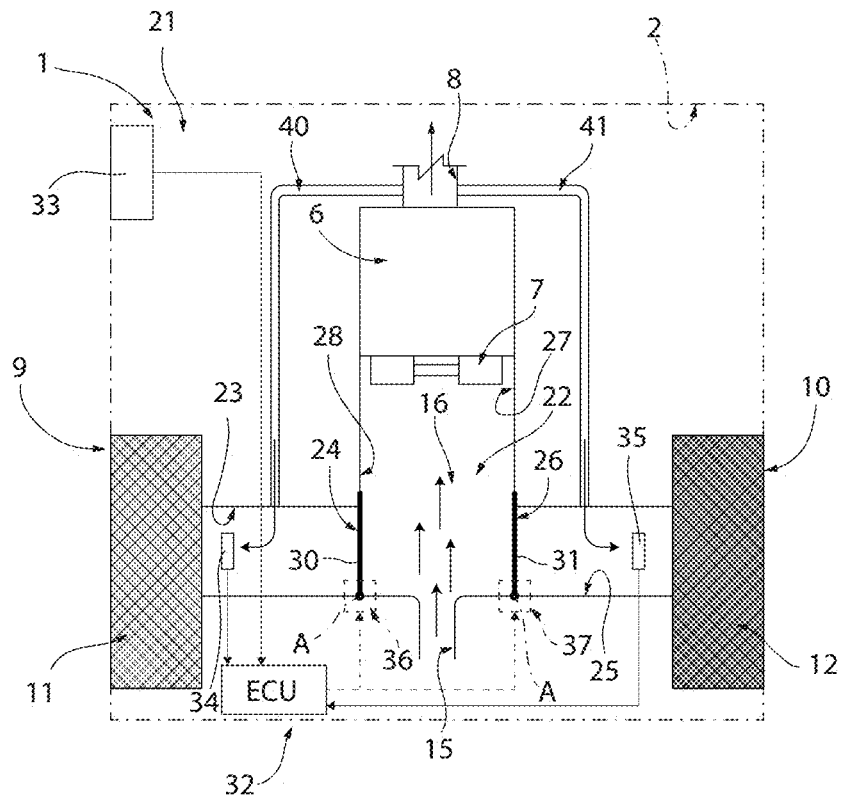
Figure 2D:
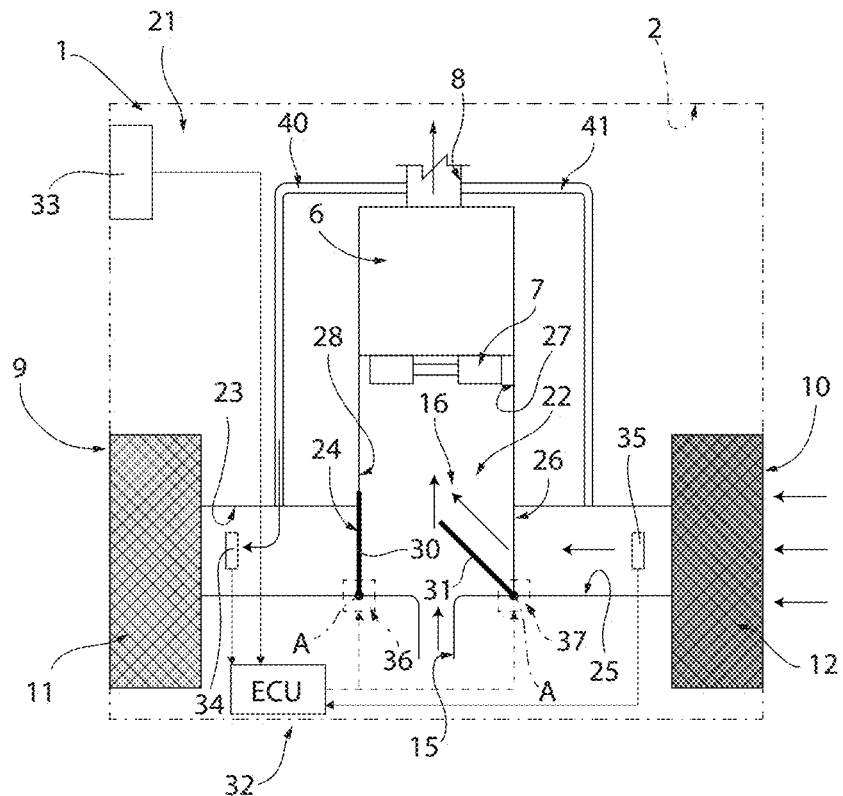

With reference to FIGS. 1 and 2A—2B, 1 denotes as a whole an air treatment system for a closable or confined room 2 of a vehicle 3, in particular for a cabin of a self-propelled agricultural machine, to which the following description will make explicit reference without losing generality.

In the case shown, the system 1 is configured to be disposed at the upper part of the room 2 of the vehicle 3, that is, the cabin of the agricultural machine.

In FIGS. 2A to 2D, the profile of the room 2 in the top view is shown schematically with a dash-dot line.

The arrows pointing downwards from the lower zone of the room 2 schematically indicate that the latter may be subject to limited air leakages in use.

The system 1 essentially comprises
a box 5 closed, preferably hermetically, outwardly and connected to the room 2;
an air conditioning device 6 located inside the box 5, provided with one fan 7 and connected to the room 2 by means of at least one supply duct 8 for supplying conditioned and pressurized air to the room 2 itself;
at least a first inlet opening 9 for external air, obtained in said box 5 and connected to said air conditioning device 6;
a second inlet opening 10 for outside air, distinct from the inlet opening 9 and also located in the box 5 and connected to the air conditioning device 6;

a first filtration device 11 carried by the box 5, having a first filtration level and located at or near the inlet opening 9 to filter external air before it reaches the air conditioning device 6;

a second filtration device 12 carried by the box 5, having a second filtration level higher than the first filtration level and located at or near the inlet opening 10 to filter external air before it reaches the air conditioning device 6;

a recirculation port 15 to allow in use recirculation of air present in the room 2 to the inside of the box 5; and a valve assembly 16 for controlling the inflow of outside air to the air conditioning device 6.

As visible in FIG. 1, the box 5 comprises a lower wall 18, preferably configured to surmount in use the room 2 of the vehicle 3, an upper wall 19, facing the lower wall 18 and defining in use the roof of the vehicle 3, and a side contour 20 peripherally connecting the lower 18 and upper 19 walls.

In the case shown, the inlet openings 9 and 10 are obtained in the side contour 20 in distinct and facing positions.

According to a possible alternative not shown, the system 1 may comprise one or more additional inlet openings for outside air, each of which is provided with a filtration device having a filtration level equal to or different from the filtration levels of the filtration devices 11, 12.

According to another possible alternative not shown, the system 1 could also comprise a single inlet opening for outside air, for example the inlet opening 9 or the inlet opening 10, provided with a respective filtration device.

Preferably, the filtration device 11 complies with the filtration requirements according to EU Category 2-standard EN 15695 (CAT 2) and the filtration device 12 complies with the filtration requirements according to EU Category 4-standard EN 15695 (CAT 4).

Both filtration devices 11, 12, schematically shown in the accompanying figures, comprise in a known manner a filtering mass and an external container housing said filtering mass.

The air conditioning device 6, commonly known by the abbreviation "HVAC" (Heating, Ventilation and Air Conditioning), comprises, in addition to the fan 7, preferably of the centrifugal type and designed to suck the air and to pressurize it, an evaporator and a heater (known in itself and not shown).

The system 1 further comprises a fluidic circuit 21 connecting together the inlet openings 9, 10, the air conditioning device 6 and the recirculation port 15 and defining a circuit node 22, in which the valve assembly 16 is housed.

In particular, the fluidic circuit 21 comprises a first inlet channel 23 connecting the inlet opening 9 with a first inlet gate 24, located at the circuit node 22, a second inlet channel 25 connecting the inlet opening 10 with a second inlet gate 26, located at the circuit node 22 in a position facing the inlet gate 24 itself, and a delivery channel 27 supplying the air conditioning device 6 and extending from a delivery gate 28 also located at the circuit node 22 in a position facing the recirculation port 15.

In greater detail, in the example shown in FIGS. 2A to 2D, the inlet gates 24, 26 are disposed on opposite lateral sides of the fluidic line connecting the recirculation port 15 to the delivery gate 28. Furthermore, the section in which the recirculation port 15 leads into the circuit node 22 is adjacent, at its opposite side ends, to the inlet gates 24 and 26, respectively.

The recirculation port 15, and more precisely the section where this inlet leads into the circuit node 22, is disposed upstream with respect to the flows of outside air from the inlet openings 9, 10 and is interposed between the latter.

In the example embodiment of the present invention shown in FIGS. 2A-2D, the valve assembly 16 comprises a first shutter member 30, acting between the inlet gate 24 and the recirculation port 15, and a second shutter member 31, acting between the inlet gate 26 and the recirculation port 15 itself.

In other words, the shutter member 30 is interposed between the inlet opening 9, the recirculation port 15 and the air conditioning device 6; the shutter member 31 is interposed between the inlet opening 10, the recirculation port 15 and the air conditioning device 6.

The shutter member 30 is movable between a plurality of operating positions included between a first limit operating position (FIGS. 2C and 2D), in which it completely closes the connection between the inlet gate 24 (or between the inlet opening 9) and the air conditioning device 6 and allows the connection between the recirculation port 15 and the air conditioning device 6 itself, and a second limit operating position (FIG. 2A), in which it completely closes the connection between the recirculation port 15 and the air conditioning device 6 and allows the connection between the inlet gate 24 (or between the inlet opening 9) and the air conditioning device 6 itself.

In a similar manner, the shutter member 31 is movable between a plurality of operating positions included between a first limit operating position (FIGS. 2A, 2B and 2C), in which it completely closes the connection between the inlet gate 26 (or between the inlet opening 10) and the air conditioning device 6 and allows the connection between the recirculation port 15 and the air conditioning device 6 itself, and a second limit operating position (not visible in the accompanying figures), in which it completely closes the connection between the recirculation port 15 and the air conditioning device 6 and allows the connection between the inlet gate 26 (or between the inlet opening 10) and the air conditioning device 6 itself.

In the movement between the aforesaid operating positions interposed between the first and the second operating limit positions, each shutter member 30, 31 varies by predefined amounts the shares of air coming from the relative inlet gate 24, 26 (or from the relevant inlet opening 9, 10) and from the recirculation port 15.

Advantageously, the system 1 further comprises a control unit 32 configured to selectively place one of the shutter members 30, 31 in the first limit operating position, in which it closes or disables the relative inlet gate 24, 26, and to adjust the operative position of the other shutter member 30, 31 so as to control the shares of air being drawn from the enabled inlet gate 24, 26 (and therefore from the enabled inlet opening 9, 10) and from the recirculation port 15 and to maintain a predetermined value of target overpressure $P_O$ in the room 2 with respect to the external pressure. In practice, the control unit 32, by varying the operating position of the shutter member 30, 31 enabling the entry of external air, adjusts the share of the latter flowing into the air conditioning device 6.

In the case shown in FIGS. 2A-2D, the shutter members 30, 31 are doors hinged to the respective adjacent zones between the recirculation port 15 and the respective inlet gates 24, 26 around respective vertical axes A, substantially orthogonal to the lower wall 18 of the box 5.

In practice, each shutter member 30, 31 is rotatable about the respective axis A between the aforesaid first and second limit operating positions.

The control unit 32 comprises:
- a pressure sensor 33 arranged inside the room 2 and generating as output a pressure signal correlated to the overpressure present in the room 2 itself with respect to the external pressure;
- a first flowmeter 34, for example a debimeter, arranged along the inlet channel 23 between the inlet opening 9 and the shutter member 30 and generating as output a flow rate signal correlated to the flow rate of external air taken from the inlet opening 9 itself;
- a second flowmeter 35, for example a debimeter, arranged along the inlet channel 25 between the inlet opening 10 and the shutter member 31 and generating as output a flow rate signal correlated to the flow rate of external air taken from the inlet opening 10 itself;
- a first actuator 36 for moving the shutter member 30 between the different operating positions;
- a second actuator 37 for moving the shutter member 31 between the different operating positions; and
- an electronic control unit ECU receiving as input pressure and flow rate signals and generating as output the respective control signals for the shutter members 30, 31.

In particular, the electronic control unit ECU generates in use:
- a first control signal, to place one of the two shutter members 30, 31 in the first limit operating position according to the required filtration level of the outside air and then of the filtration device 11, 12 which must be disabled; and
- a second control signal for the other shutter member 30, 31, i.e. the one enabling the flow of air from the outside at the selected filtration level, to adjust its operating position according to the difference between the overpressure detected in the room 2 and the target overpressure value $P_0$ and according to the maximum limit of external air flow rate set for a correct operation of the selected filtration device 11, 12.

The system 1 also comprises:
- a first distribution channel 40 exiting the air conditioning device 6 and leading into the inlet channel 23 downstream of the flow meter 34 and upstream of the circuit node 22 with reference to the flow of external air coming from the inlet opening 9; and
- a second distribution channel 41 exiting the air conditioning device 6 and leading into the inlet channel 25 downstream of the flow meter 35 and upstream of the circuit node 22 with reference to the flow of external air coming from the inlet opening 10.

The distribution channels 40, 41 have a section much lower than that of the inlet channels 23, 25, the delivery channel 27 and the recirculation port 15 and therefore allow conveying reduced air flows.

The distribution channels 40, 41 are always active and therefore allow the flow of air from the air conditioning device 6 to the respective inlet channels 23, 25 under each operating condition of the valve assembly 16 and more precisely in each operating position, including the limit operating positions, of the shutter members 30, 31.

The distribution channels 40, 41 allow to have a flow of recirculated air outwardly when the respective inlet channel 23, 25 is disabled and inwardly when it is enabled.

In the condition where the inlet opening 9 is disabled, the distribution channel 40 conveys an air flow to the outside of the filtration device 11 and the flow meter 34 can be employed to detect direction and speed of the air flow rate of the flow to the filtration device 11 itself from the distribution channel 40.

Similarly, in the condition where the inlet opening 10 is disabled, the distribution channel 41 conveys a flow of air for washing the filtration device 12 and the flow meter 35 can be used to detect direction and speed of the flow to the filtration device 12 itself coming from the distribution channel 41.

The operation of the system 1 is as follows.

Depending on the conditions and the type of contaminants present in the external environment in which the vehicle 3 is to operate, the desired or most suitable filtration level is chosen.

In case the external environment is little or minimally polluted with contaminants, via the electronic control unit ECU, the filtration device 11 is enabled and the filtration device 12 is disabled. For this purpose, the electronic control unit ECU sends a control signal to the actuator 37 to place and maintain the shutter member 31 in the second limit operating position, in which it closes the inlet gate 26 and thus the inflow of external air from the inlet opening 10 to the air conditioning device 6.

On the basis of the pressure signal received from the pressure sensor 33 and on the basis of the flow rate signal received from the flowmeter 34, the electronic control unit ECU controls the actuator 36 to adjust the operating position of the shutter member 30 and thus to adjust the shares of air drawn from the inlet opening 9 and from the recirculation port 15.

In particular, if the overpressure measured in the room 2 is lower than the target overpressure value $P_0$, the electronic control unit ECU determines, by means of the actuator 36, a displacement of the shutter member 30 towards the recirculation opening 15 so as to reduce the recirculated air flow rate and to increase the air flow rate taken from outside through the inlet opening 9.

On the other hand, if the overpressure measured in the room 2 is greater than the target overpressure value $P_0$, the electronic control unit ECU determines, by means of the actuator 36, a displacement of the shutter member 30 towards the inlet gate 24 so as to reduce the air flow rate taken from outside through the inlet opening 9 and to increase the recirculated air flow rate through the recirculation port 15.

The electronic control unit ECU always verifies that the flow rate of external air taken from the active inlet opening 9 is maintained within a predetermined range of values, for example that it does not exceed the value beyond which the performance of the active filtration device 11 could fail.

A minimum share of air is taken from the air conditioning device 6 and flushed through the distribution channels 40, 41 towards both inlet channels 23, 25 in order to pressurize them and therefore not allow leakages inwards. The air flushed through the inlet channel 25 towards the disabled filtration device also allows said filtration device to be washed, while the air flushed towards the active filtration device 11 has no practical effect and does not even influence the detection of the flow meter 34, since the latter detects only the air flow towards the circuit node 22 and not in the opposite direction.

Conversely, the flow meter 35, located on the inlet channel 35 associated with the disabled filtration device 12 may be used to measure direction and speed of flow to the filtration device 12 itself.

Depending on the operating position of the shutter member 30, the air, which partly derives from the active inlet opening 9 and partly from the recirculation port 15, then flows through the delivery gate 28 into the delivery channel 27 and from here to the air conditioning device 6 and then to the room 2.

In a manner quite similar to the one seen above, in the event that the external environment is heavily polluted by contaminants, through the electronic control unit ECU, the filtration device 12 is enabled and the filtration device 11 is disabled. For this purpose, the electronic control unit ECU sends a control signal to the actuator 36 to place and maintain the shutter member 30 in the second limit operating position, in which it closes the inlet gate 24 and thus the inflow of external air from the inlet opening 9 to the air conditioning device 6.

On the basis of the pressure signal received from the pressure sensor 33 and on the basis of the flow rate signal received from the flowmeter 35, the electronic control unit ECU controls the actuator 37 to adjust the operating position of the shutter member 31 and thus to adjust the shares of air drawn from the inlet opening 10 and from the recirculation port 15.

The operation in this condition is completely similar, mutatis mutandis, to what has been seen previously and will not be described further for reasons of brevity. The only difference consists in the stricter limits provided in this case, in line with the regulations for filtration devices.

With reference to FIGS. 3A, 3B and 3C, 1' denotes as a whole an air treatment system for the room 2 of the vehicle 3, according to an alternative embodiment of the present invention.

Since the system 1' is similar, structurally and functionally, to the system 1, only its distinctive characteristics with respect to the latter will be described below, indicating, where possible, components and parts corresponding or equivalent to those already described with the same reference numbers.

In particular, the system 1' differs from the system 1 essentially in that it comprises a recirculation port 15' disposed downstream with respect to the flows of external air coming from the inlet openings 9, 10 and interposed between the latter and the air conditioning device 6.

In this case, the recirculation port 15' leads into the delivery channel 27, at the delivery gate 28, with a through opening having a lying plane substantially parallel to the lower wall 18.

The valve assembly 16 comprises a first shutter member 30' acting between the delivery gate 22 and the recirculation port 15, and a second shutter member 31', acting between the inlet gates 24 and 26 and disposed upstream of the shutter member 30' with respect to the air flows coming from the inlet openings 9 and 10 and therefore from the inlet gates 24 and 26 themselves.

In more general terms, the shutter member 30' is interposed between the inlet openings 9, 10, the recirculation port 15 and the air conditioning device 6; the shutter member 31' is instead interposed between the inlet openings 9 and 10 and is located upstream of the recirculation port 15 and the air conditioning device 6 with respect to the external air flows coming from the inlet openings 9, 10 themselves.

The shutter member 30', in analogy to the shutter member 30, is movable between a plurality of operating positions included between a first limit operating position (not shown), in which it completely closes the connection between the inlet gate 24 or the inlet gate 26 (or between the inlet opening 9 or the inlet opening 10) and the delivery gate 28 (and the air conditioning device 6) and it allows the connection between the recirculation port 15' and the air conditioning device 6 itself, and a second limit operating position (also not shown), in which it completely closes the connection between the recirculation port 15' and the delivery gate 28 (and thus the air conditioning device 6) and it allows the connection between the inlet gate 24 or the inlet gate 26 (or between the inlet opening 9 or the inlet opening 10) and the air conditioning device 6 itself.

The shutter member 31' is movable between a first selection position (FIG. 3A), in which it enables the connection between the inlet gate 24 (and thus between the inlet opening 9) and the air conditioning device 6 and disables the inlet gate 26 (and thus the inlet opening 10), and a second selection position (FIG. 3B), in which it enables the connection between the inlet gate 26 (and thus the inlet opening 10) and the air conditioning device 6 and disables the inlet gate 24 (and thus the inlet opening 9).

The electronic control unit ECU is therefore programmed to arrange the shutter member 31', via a respective actuator 37', in one of the aforementioned first and second selection positions and to adjust the operating position of the shutter member 30', via a respective actuator 36', so as to control the share of external air flowing to the air conditioning device 6 from the enabled inlet gate 24 or 26 (and thus from the enabled inlet opening 9 or 10).

Figure 3A:
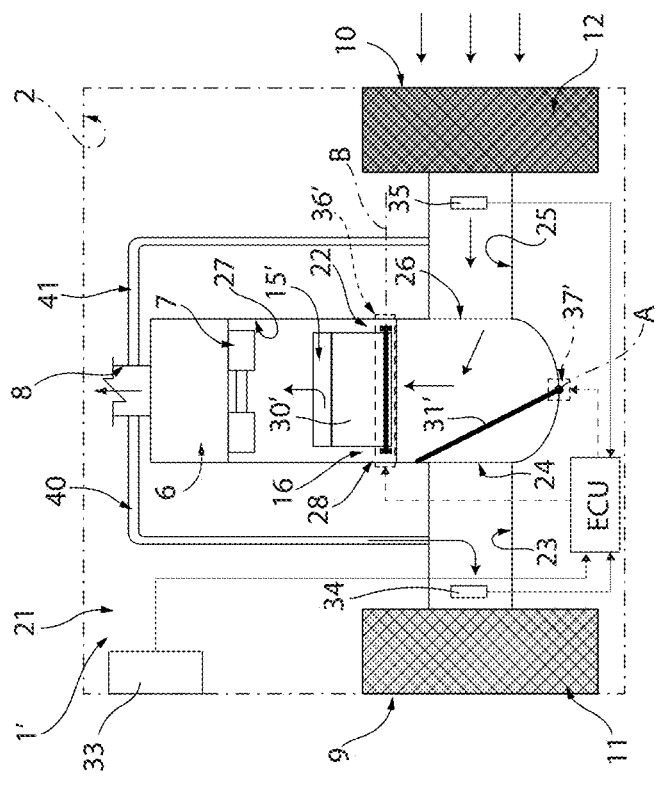
FIGS. 3A and 3B show schematically, in top view and with parts removed for clarity's sake, a different embodiment of the air treatment system according to the present invention under two different operating conditions.
Figure 3B:
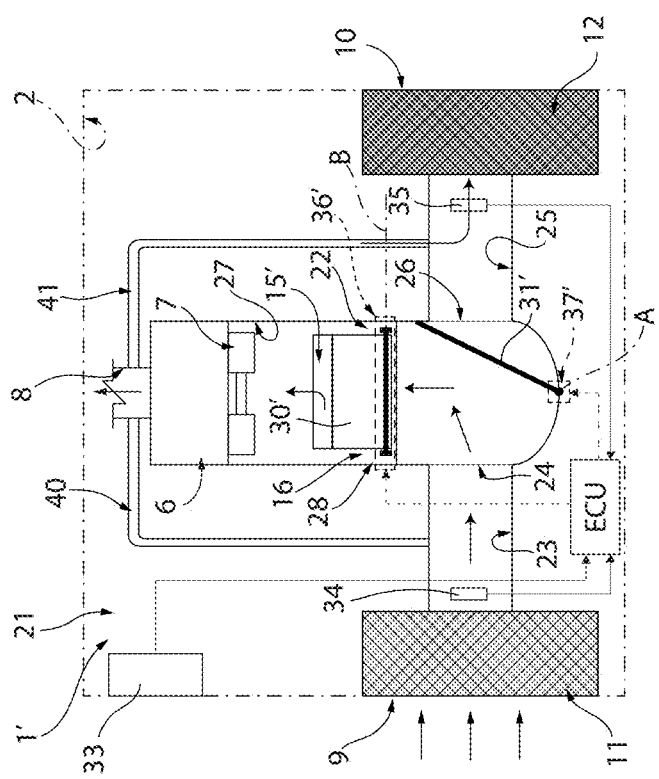
Figure 3C:
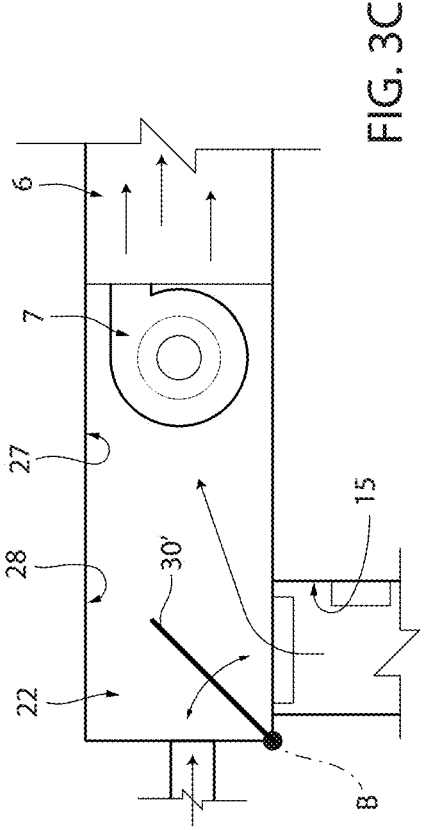
FIG. 3C shows, in side view on an enlarged scale and with parts removed for clarity's sake, a detail of the system of FIGS. 3A and 3B.

Also in the solution shown in FIGS. 3A-3C, the shutter members 30', 31' are doors hinged about respective axes of the circuit node 22; the shutter member 30' is hinged, in the adjacency zone between the recirculation port 15' and the delivery gate 28, about a horizontal axis B substantially parallel to the lower wall 18 of the box 5; the shutter member 31' is hinged in an intermediate position between the inlet gates 24 and 26 about a vertical axis A, substantially orthogonal to the lower wall 18 of the box 5.

In practice, the shutter members 30', 31' are rotatable about their respective axes B, A.

The operation of the system 1' is similar to that of the system 1 and is described below only insofar as it differs from the latter.

Depending on the conditions and the type of contaminants present in the external environment in which the vehicle 3 is to operate, the desired or most suitable filtration level is chosen.

In case the external environment is little or minimally polluted with contaminants, via the electronic control unit ECU, the filtration device 11 is enabled and the filtration device 12 is disabled. For this purpose, the electronic control unit ECU sends a control signal to the actuator 37' to place and maintain the shutter member 31' in the first selection position (FIG. 3A), in which it closes the inlet gate 26 and thus the inflow of outside air from the inlet opening 10 to the air conditioning device 6.

On the basis of the pressure signal received from the pressure sensor 33 and on the basis of the flow rate signal received from the flowmeter 34, the electronic control unit ECU controls the actuator 36' to adjust the operating position of the shutter member 30' and thus to adjust the shares of air drawn from the inlet opening 9 and from the recirculation port 15'.

The electronic control unit ECU always verifies that the flow rate of external air taken from the active inlet opening 9 is maintained within a predetermined range of values, for example that it does not exceed the value beyond which the performance of the active filtration device 11 could fail.

Also in this case, a small share of air is drawn from the air conditioning device 6 and flushed through the distribution channels 40, 41 towards the inlet channels 23, 25 in order to pressurize them and then to both filtration devices 11, 12. The air flushed towards the disabled filtration device 12 allows said filtration device to be washed, while the air flushed towards the active filtration device 11 has no practical effect and does not even influence the detection of the flow meter 34, since the latter detects only the air flow towards the circuit node 22 and not in the opposite direction.

Conversely, the flow meter 35, located on the inlet channel 35 associated with the disabled filtration device 12 may be used to measure washing direction and speed of the filtration device 12 itself.

Depending on the operating position of the shutter member 30', the air, which partly derives from the active inlet opening 9 and partly from the recirculation port 15', then flows through the delivery gate 28 into the delivery channel 27 and from here to the air conditioning device 6 and then to the room 2.

If, on the other hand, the external environment is heavily polluted with contaminants, via the electronic control unit ECU, the filtration device 12 is enabled and the filtration device 11 is disabled. For this purpose, the electronic control unit ECU sends a control signal to the actuator 37' to place and maintain the shutter member 31' in the second selection position (FIG. 3B), in which it closes the inlet gate 24 and thus the inflow of outside air from the inlet opening 9 to the air conditioning device 6.

On the basis of the pressure signal received from the pressure sensor 33 and on the basis of the flow rate signal received from the flowmeter 35, the electronic control unit ECU controls the actuator 36' to adjust the operating position of the shutter member 30' and thus to adjust the shares of air drawn from the inlet opening 10 and from the recirculation port 15'.

From an examination of the characteristics of the systems 1, 1' made according to the present invention, the advantages that it allows obtaining are evident.

In particular, the solutions described and shown herein make it possible, in an extremely simple manner, to vary the shares of air taken from the external environment and through recirculation so as to maintain a constant pressurization in the room 2, while ensuring that the flow rate of air flowing from the outside is always under control, for example does not exceed the limit value beyond which the performance of the filtration devices could fail.

The solutions subject-matter of the invention also have reduced dimensions, costs and consumption compared to the known solutions and allow, in an extremely simple way, the total exclusion of recirculation, that is, the supply of the air conditioning device only with air from the outside, or the total exclusion of the inflow of air from the outside, for example in case of malfunctions.

Finally, the systems 1, 1' do not need to operate in a pressurized compartment.

It is clear that modifications and variations can be made to the systems 1, 1' described and shown herein, without thereby departing from the scope of protection defined by the claims.

The invention claimed is:

1. Air treatment system (1, 1') for a closable room (2) of a vehicle (3), in particular for a cabin of the vehicle itself, said system (1, 1') comprising:
a box (5) closed outwardly and connectable to said room (2);
an air conditioning device (6) located inside said box (5), provided with at least one fan (7) and connectable to said room (2) by means of at least one supply duct (8) for supplying conditioned and pressurized air to the room (2) itself;
at least a first inlet opening (9) for external air, obtained in said box (5) and connected to said air conditioning device (6);
at least a first filtration device (11) carried by said box (5) and located at or near to said first inlet opening (9) to filter external air before it reaches said air conditioning device (6);
at least one recirculation port (15, 15') to allow in use recirculation of air present in said room (2) to said air conditioning device (6); and
a valve assembly (16) for controlling at least the inflow of outside air to said air conditioning device (6);
characterized in that said valve assembly (16) comprises at least one first shutter member (30, 30'), in particular a door pivotable about a respective axis, interposed between the first inlet opening (9), the recirculation port (15, 15') and the air conditioning device (6) and movable between a plurality of operating positions included between a first limit operating position, in which the door completely closes the connection between the first inlet opening (9) and the air conditioning device (6) and allows the connection between the recirculation port (15, 15') and the air conditioning device (6) itself, and a second limit operating position, in which the door completely closes the connection between the recirculation port (15, 15') and the air conditioning device (6) and allows the connection between the first inlet opening (9) and the air conditioning device (6) itself;
in that, in the movement between said operating positions interposed between said first and second limit operating positions, said first shutter member (30, 30') varies by predefined amounts the shares of air coming from said first inlet opening (9) and said recirculation port (15, 15'); and
in that the treatment system further comprises a control unit (32) configured to adjust the operating position of said first shutter member (30, 30') so as to control the shares of air being drawn from said first inlet opening (9) and from said recirculation port (15, 15') and to maintain a predetermined value of target overpressure ($P_O$) in said room (2) with respect to the external pressure.

2. A system according to claim 1, wherein said valve assembly (16) is arranged at a circuit node (22) interposed at least between said first inlet opening (9), said recirculation port (15, 15') and said air conditioning device (6).

3. A system according to claim 1, wherein said control unit (32) comprises:
a pressure sensor (33) configured to be arranged arranged in use inside said room (2) and generating as output a pressure signal correlated to the overpressure present in said room (2) with respect to the external pressure;
a first flowmeter (34) arranged between the first inlet opening (9) and said first shutter member (30, 30') and generating as output a flow rate signal correlated to the flow rate of external air taken from the first inlet opening (9);
a first actuator (36, 36') for moving said first shutter member (30, 30') between the operating positions; and
an electronic control unit (ECU) receiving as input said pressure and flow rate signals and generating as output a control signal for said first actuator (36, 36') according to the difference between the overpressure detected in use in said room (2) and said target overpressure value ($P_0$) and according to the external air flow rate limits set for a correct operation of said first filtration device (11).

4. A system according to claim 3, further comprising:
at least one second inlet opening (10) for outside air, distinct from said first inlet opening (9), obtained in said box (5) and connected to said air conditioning device (6); and
at least one second filtration device (12), having a filtration level different from the filtration level of the first filtration device (11), carried by said box (5) and arranged at or near said second inlet opening (10) for filtering outside air before it reaches said air conditioning device (6);
wherein said valve assembly (16) comprises a second shutter member (31, 31'), in particular a door pivotable about a respective axis, interposed between said second inlet opening (10), said recirculation port (15, 15') and said air conditioning device (6) and cooperating with said first shutter member (30, 30') to selectively disable the connection of one of said first and second inlet openings (9, 10) with said air conditioning device (6).

5. A system according to claim 4, wherein said control unit (32) further comprises:
a second flow meter (35) arranged between the second inlet opening (10) and said second shutter member (31, 31') and generating as output a flow signal for said electronic control unit (ECU) correlated to the flow rate of outdoor air taken from the second inlet opening (10); and
a second actuator (37, 37') controlled by said electronic control unit (ECU) for moving said second shutter member (31, 31').

6. A system according to claim 5, wherein said recirculation port (15) is disposed upstream with respect to external air flows from said first and second inlet openings (9, 10) and is interposed between said first and second inlet openings (9, 10); wherein said second shutter member (31) is interposed between said second inlet opening (10), said recirculation port (15) and said air conditioning device (6) and is movable between a plurality of operating positions comprised between a first limit operating position, in which it completely closes the connection between the second inlet opening (10) and the air conditioning device (6) and allows connection between the recirculation port (15) and the air conditioning device (6) itself, and a second limit operating position, in which it completely closes the connection between the recirculation port (15) and the air conditioning device (6) and allows connection between the second inlet opening (10) and the air conditioning device (6) itself; and wherein the electronic control unit (ECU) is programmed to selectively place one of said first and second shutter members (30, 31) in the first limit operating position and to adjust the operating position of the other of said first and second shutters (30, 31) so as to control the share of external air flowing to said air conditioning device (6).

7. A system according to claim 5, wherein said recirculation port (15') is disposed downstream with respect to the outside air flows from said first and second inlet openings (9, 10) and is interposed between said first and second inlet openings (9, 10) themselves; wherein said second shutter member (31') is arranged upstream of said first shutter member (30') with respect to air flows coming from said first and second inlet openings (9, 10), is interposed between said first and second inlet openings (9, 10) themselves, and is movable between a first selection position, in which it enables the connection between the first inlet opening (9) and the air conditioning device (6) and disables the second inlet opening (10), and a second selection position, in which it enables the connection between the second inlet opening (10) and the air conditioning device (6) and disables the first inlet opening (9); and in which the electronic control unit (ECU) is programmed to place said second shutter member (31') in one of said first and second selection positions and to adjust the operating position of said first shutter member (30') so as to control the share of external air flowing to said air conditioning device (6).

8. A system according to claim 5, further comprising a first and a second inlet channel (23, 25) respectively provided with said first and second flow meter (34, 35) and respectively connecting said first and second inlet openings (9, 10) with said circuit node (22) housing said valve assembly (16).

9. The system according to claim 8, further comprising:
a first distribution channel (40) exiting said air conditioning device (6) and leading into said first inlet channel (23) downstream of said first flow meter (34) and upstream of said circuit node (22) with reference to the flow of external air coming from said first inlet opening (9); and
a second distribution channel (41) exiting said air conditioning device (6) and leading into said second inlet channel (25) downstream of said second flowmeter (35) and upstream of said circuit node (22) with reference to the flow of external air coming from said second inlet opening (10).

10. A system according to claim 9, wherein said first and second distribution channels (40, 41) are connected respectively to said first and second inlet channels (23, 25) in any operating condition of said valve assembly (16).

* * * * *